(12) United States Patent
Bird et al.

(10) Patent No.: US 7,351,129 B2
(45) Date of Patent: Apr. 1, 2008

(54) BALLBAR EQUIPMENT

(75) Inventors: Julian D Bird, Bristol (GB); Robert L Smith, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/710,970

(22) Filed: Feb. 27, 2007

(65) Prior Publication Data
US 2007/0212981 A1 Sep. 13, 2007

(30) Foreign Application Priority Data
Mar. 9, 2006 (GB) ................................. 0604748.4

(51) Int. Cl.
*B24B 49/00* (2006.01)

(52) U.S. Cl. ............................................ 451/8; 451/11

(58) Field of Classification Search ...................... 451/8, 451/9, 10, 11, 56
See application file for complete search history.

(56) References Cited
U.S. PATENT DOCUMENTS 4,435,905 A * 3/1984 Bryan .......................... 33/613
4,884,348 A * 12/1989 Zeller et al. .................... 33/502
5,430,948 A 7/1995 Vander Wal, III
5,813,128 A * 9/1998 Bailey ........................... 33/502
6,926,586 B2 * 8/2005 Han ................................ 451/8
6,955,584 B2 * 10/2005 Giurgiuman et al. ........... 451/5
6,988,434 B1 * 1/2006 Jiao ............................... 83/13

FOREIGN PATENT DOCUMENTS
GB    2 211 296 A    6/1989

* cited by examiner

*Primary Examiner*—Dung Van Nguyen
(74) *Attorney, Agent, or Firm*—Oliff & Berridge, PLC

(57) ABSTRACT

A ballbar is used to assess the accuracy of relative motion between an arbor and a table 4—of a machine tool. Mounting components are secured respectively to the arbor and the table-4. Each mounting component comprises a block that has provision on three orthogonal surfaces for receiving support means for a ballbar. By appropriate selection of the mounting faces, it is possible to set up the ballbar to check motion in all three of the operating planes of the machine. The mounting component comprises a ring for fitting over the arbor of the grinding machine, and the mounting block is connected to the ring by a rod.

12 Claims, 4 Drawing Sheets

BALLBAR EQUIPMENT

This invention relates to ballbar equipment, for assessing motion inaccuracies in machine tools.

BACKGROUND

When a machine tool performs a cutting operation, it is necessary for the workpiece to be moved relatively to the cutting tool. Inaccuracies in this relative motion results in inaccuracies in the machined workpiece. It is therefore desirable to check periodically that relative motion between parts of the machine tool take place with acceptable accuracy.

This can be done by mounting a ballbar between, for example, the workpiece supporting table and the tool holder of the machine tool, and then causing the tool holder and the table to perform a circular movement about an axis passing through one end of the ballbar.

A ballbar is a telescopic bar which incorporates a highly sensitive position sensor. Any variation in the length of the bar is detected by the position sensor to provide a signal which can be processed by appropriate software to show any discrepancy between the actual and desired relative motions between the tool holder and the table.

In a perfectly accurate machine, the circular relative movement between the tool holder and the table would take place without any variation in the length of the ballbar. However, in practice, many factors, such as lateral play, backlash and control errors will cause the relative motion to vary from the perfectly circular, and consequently there will be changes in the length of the ballbar during the test.

Most machine tools have a workpiece supporting table which is movable in two mutually perpendicular directions in its own plane. Furthermore, either the tool or the table is movable towards and away from the other. Conventionally, the tool axis is referred to as the Z axis, and the directions of the other two motions are referred to as the X and Y axes.

Currently available ballbars are supplied with mounting components for supporting the ends of the ballbar respectively on the table and the tool holder. The mounting components are adapted for use with CNC milling machines that have removable tool holders that can receive the respective mounting component. Furthermore, the mounting components available for use with ballbars are capable only of checking relative movements in the X Y plane, which, in a vertical machining centre, is the plane of the workpiece supporting table.

The currently available ballbar kits are consequently not suitable for use with horizontal grinding machines (i.e. grinding machines in which the rotational axis of the grinding wheel is horizontal). Such machines have grinding wheel arbors instead of tool holders. It is not possible to fit existing ballbar mounting components to such arbors. Furthermore, since motion of the grinding wheel towards or away from the workpiece (in the Y axis direction in a horizontal grinding machine) is of fundamental importance in grinding operations, it is desirable to be able to use a ballbar to check for inaccuracies in all three planes.

SUMMARY

According to the present invention there is provided ballbar equipment comprising:
a tool mounting component for securing to a tool holder of a machine tool and adapted to receive a supporting element for connection to one end of a ballbar; and
a table mounting component for securing to a table of the machine tool and adapted to receive a supporting element for connection to the other end of the ballbar; characterised in that each of the tool mounting components comprises three receiving means for receiving the respective supporting element, the receiving means of each mounting component being disposed orthogonally with respect to each other.

With ballbar equipment in accordance with the present invention, it is possible to set up the equipment on a machine tool for checking motion in all three of the XY, XZ and YZ planes.

The tool mounting component is preferably adapted for use on a grinding machine, for example a horizontal grinding machine. Thus, the tool mounting component may be adapted to be mounted on a grinding wheel arbor.

In the context of the present invention, the expression "machine tool" is to be interpreted broadly to cover not only milling machines but also grinding machines, and accordingly the expression "tool holder" is to be interpreted broadly as covering any component or apparatus which serves to support a cutting tool, which may include a grinding wheel in a machine tool. In particular, the expression "tool holder" is to be interpreted sufficiently broadly to embrace a grinding wheel arbor in a grinding machine.

The tool mounting component may thus comprise a ring which can be fitted over the grinding wheel arbor of a grinding machine. Securing means may be provided for fixing the ring on the arbor, and locking means may be provided on the ring for preventing rotation of the arbor during a ballbar test. The locking means may comprise a lug projecting from the ring, and provided with a locking screw for engagement with a fixed part of the machine tool to prevent rotation of the arbor.

The orthogonal receiving means of the tool mounting component may be provided on a mounting block which is connected to the ring by a connecting rod.

The table mounting component may comprise a mounting block which is adapted to be secured to the table of the machine tool, the orthogonal receiving means being provided on the mounting block.

The present invention also provides a method of evaluating a machine tool using ballbar equipment as defined above, which method comprises the steps of:
(a) mounting the tool mounting component on a tool holder of the machine tool;
(b) mounting the table mounting component on a table of the machine tool, the mounting components being oriented so that the respective receiving means are directed oppositely to each other and aligned with respective axes of the machine tool;
(c) fitting supporting elements to an oppositely directed pair of receiving means;
(d) connecting the ballbar between the support means;
(e) causing relative rotation between the tool holder and the table about one of the supporting elements; and
(f) determining, by means of the ballbar, the path followed by the other mounting means during the relative rotation.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF EMBODIMENTS

Figure 1:
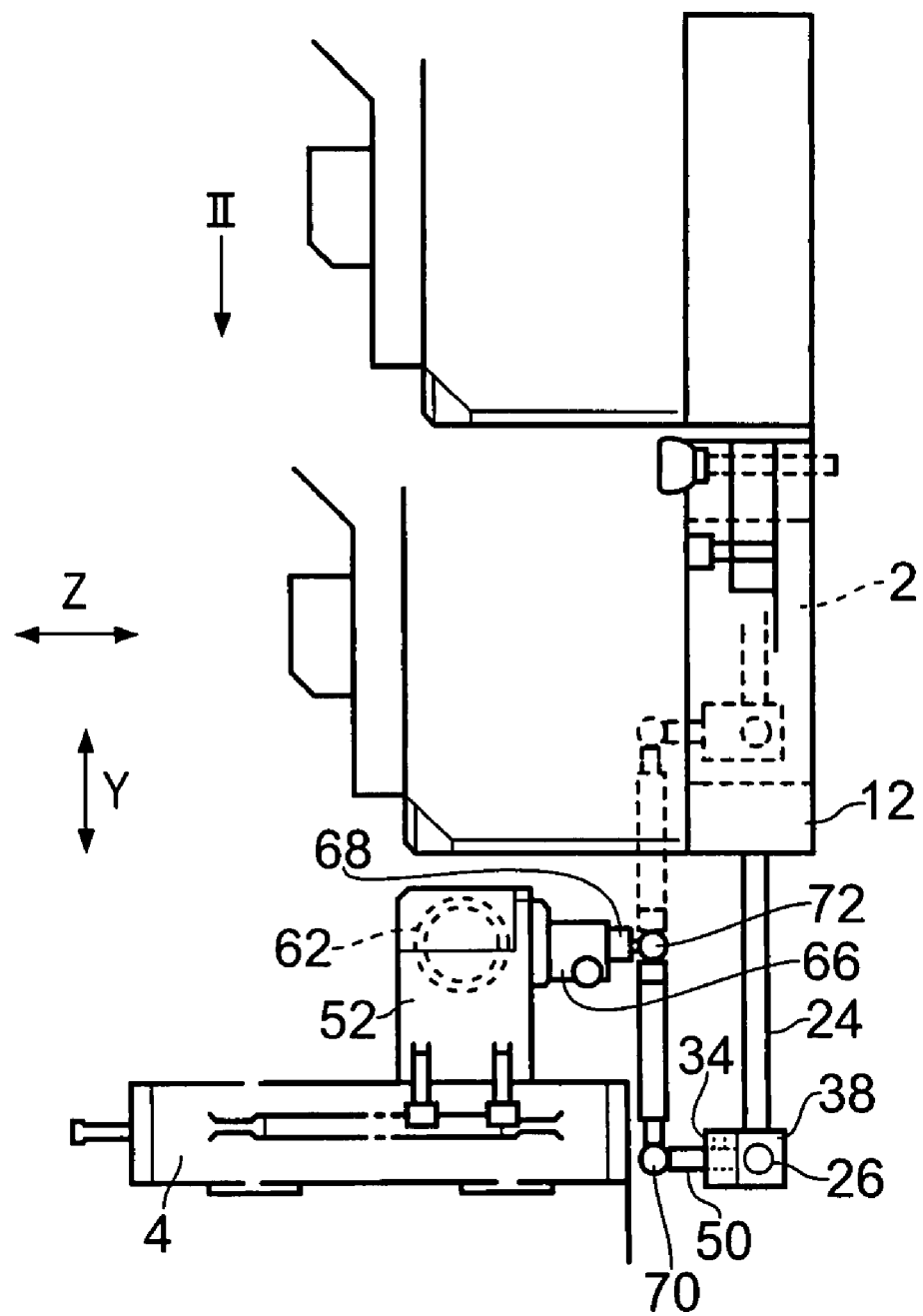
FIG. 1 is a side view of ballbar equipment set up on a grinding machine to check motion in the XY plane.
Figure 2:
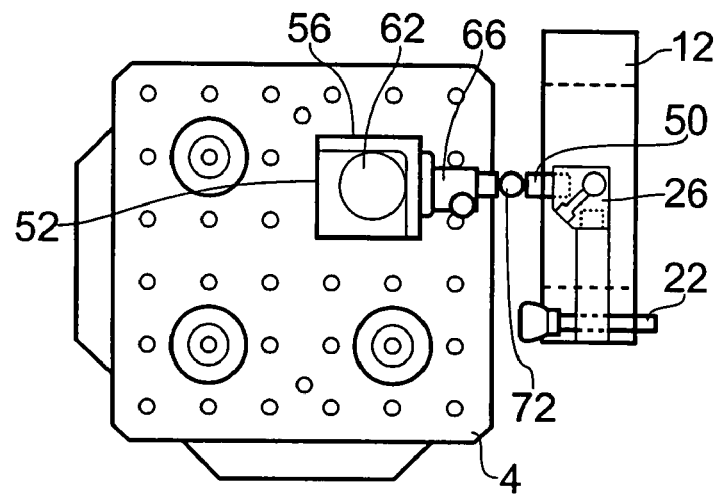
FIG. 2 is a partial view in the direction of the arrow 11 in FIG. 1.
Figure 4:
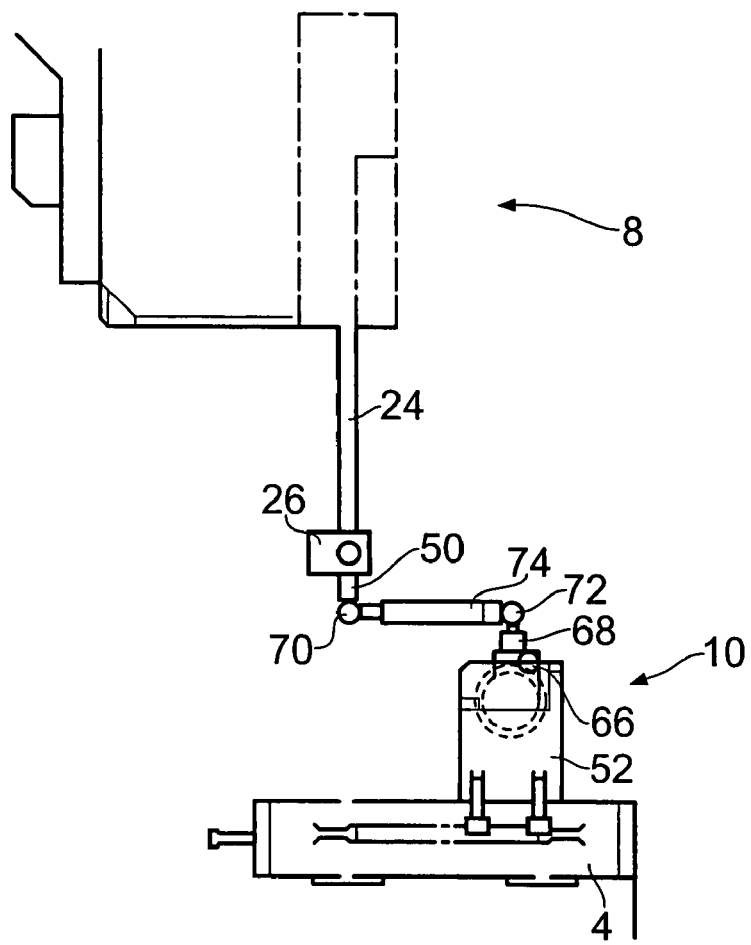
FIG. 4 corresponds to FIG. 1, but shows the ballbar equipment set up to check motion in the XZ plane.

FIGS. 1 and 4 show part of a CNC machine tool in the form of a horizontal axis grinding machine including an arbor 2 on which, for use, a grinding wheel is fitted. The arbor is connected to a motor and is rotated in operation to perform a grinding operation on a workpiece. The grinding machine also has a table 4 on which, in operation, a workpiece is mounted.

Figure 3:
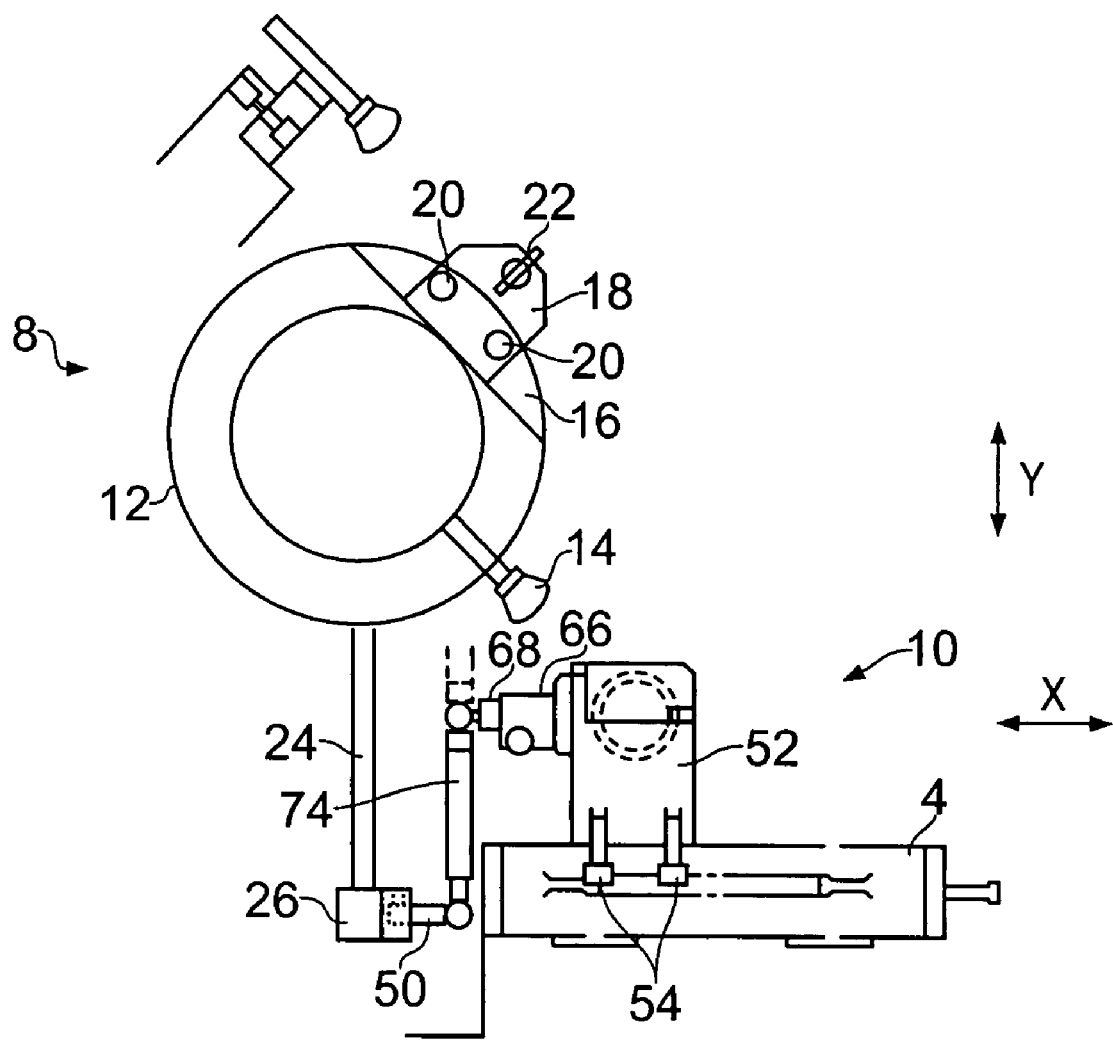
FIG. 3 corresponds to FIG. 1, but shows the ballbar equipment set up to check motion in the YZ plane.

FIGS. 1 to 4 show the grinding machine set up for the performance of a motion accuracy test, for which the grinding wheel is removed from the arbor 2 and no workpiece is present on the table 4. For normal operation, a workpiece is secured to the table 4, and the machine is then set up so as to automatically move the table, and consequently the workpiece, side-to-side beneath a grinding wheel mounted on the arbor 2, in the X direction as indicated in FIG. 3. The table is also gradually progressed in the Z direction indicated in FIG. 1, so that the full surface to be ground is exposed to the grinding wheel. After each sequence of passes, the table 4 is elevated, or the grinding wheel is lowered, in the Y direction, as indicated in FIGS. 1, 3 and 4, in order to remove the required amount of material from the workpiece. In some cases, the grinding operation may utilise simultaneous movement in the X,Y and Z direction.

In order to provide an accurate finished surface, it is essential for the various relative motions between the grinding wheel (i.e. the arbor 2) and the table 4 to follow their desired paths extremely accurately. In order to check the accuracy of these motions, a ballbar 74 and associated components are used.

As shown in FIG. 3, the ballbar 74 is supported between a tool holder mounting component 8 and a table mounting component 10. The tool holder mounting component 8 comprises a ring 12 which is sized so as to fit snugly over the arbor 2. Securing means in the form of a thumbscrew 14 is provided to fix the ring 12 securely on the arbor 2.

A sector-shaped recess 16 is formed in the ring 12 and, in this recess, sits a lug 18 which is secured to the ring by screws 20. The part of the lug 20 which projects beyond the outer circumference of the ring 12 has a threaded hole, and a thumbscrew 22 engages this hole and can be manipulated to engage a fixed part of the grinding machine so as to prevent rotation of the arbor 2 during the ballbar test.

A rod 24 is screwed into a threaded hole in the ring 12 and, when the tool holder mounting component is fitted to the arbor 2, projects vertically downwardly from the ring 12. At its lower end, the rod 24 carries a mounting block 26, which is shown in more detail in FIGS. 7 and 8.

The mounting block is generally in the shape of a cuboid having one edge removed to provide an oblique surface 28.

Figure 7:
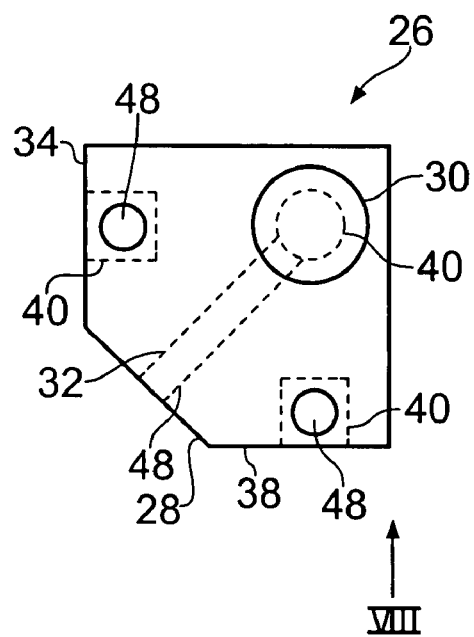
FIG. 7 is a plan view of a tool holder mounting component of the equipment of FIGS. 1 to 4.
Figure 8:
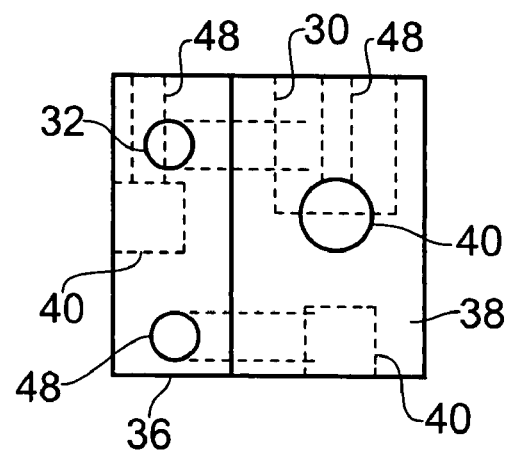
FIG. 8 is a view in the direction of the arrow VIII in FIG. 7.

As seen in FIG. 7, the mounting block 26 has a screwthreaded hole 30 in its top surface, which receives the rod 24. A screwthreaded hole 32 extends inwardly from the oblique surface 28 to the screwthreaded hole 30 and receives a locking screw which serves to lock the block 26 against rotation on the rod 24.

The block 26 has three orthogonal surfaces 34, 36 and 38. The surfaces 34 and 38 are on mutually perpendicular sides of the block 26, while the surface 36 is on the bottom of the block 26. Receiving means in the form of a plain bore 40 extends inwardly from each of the surfaces 34, 36 and 38, and is intersected by a screwthreaded hole 48.

Each of the bores 40 can receive a supporting element in the form of a ballbar mounting pin 50, as shown in FIGS. 1, 3 and 4. It will be appreciated that, when the ring 12 is fitted to the arbor 2, and the block 26 is appropriately oriented, the mounting faces 34, 36, 38 will lie perpendicular to the respective X, Y and Z axes.

Figure 5:
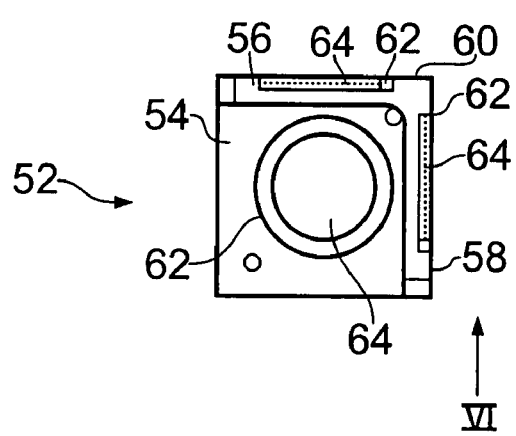
FIG. 5 is a plan view of a table mounting component of the equipment of FIGS. 1 to 4.
Figure 6:
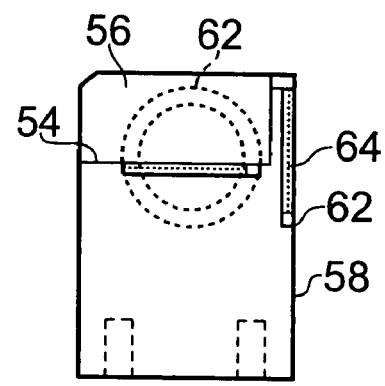
FIG. 6 is a view in the direction VI in FIG. 5.

The table mounting component 10 comprises a block 52 secured to the table 4 by bolts 54. The block 52 is shown in more detail in FIGS. 5 and 6. It is of generally cuboid shape having a top surface 54 which is provided on two sides with a wall 56. The wall 56 extends upwardly from two mutually perpendicular side faces 58, 60. The top surface 54 and the side walls 58 and 60 thus comprise orthogonal mounting surfaces. Each of these surfaces 54, 58, 60 is provided with receiving means in the form of a shallow circular depression 62 within which is situated a thin pad 64 of magnetic material. This pad 64 may be omitted where the mounting component 10 is made of a magnetisable material such as steel.

As can be seen from FIGS. 1 to 4, a supporting element in the form of a holder 66 can be located in any one of the recesses 62, where it is held in place by means of a magnet fitted to the holder 66 which attracts to the pad 64. The holder 66 is provided with a mounting pin 68. The mounting pin 68 is provided at its free end with a ball 72 of magnetic material such as steel. The mounting pin 50 has, at its end away from the block 26, an end surface provided with a recess surrounded by a bearing ring (not shown) having three raised projections. The recess contains a magnet (not shown). The ballbar 74 extends between the ball 72 and the free end of the mounting pin 50 on the block 26.

The ballbar 74 has, at its end adjacent the mounting pin 50, a ball 70 of magnetic material such as steel. The ball 70 is magnetically attracted to the bearing ring on the mounting pin 50, and seats on the three projections which serve as locating points. A reverse arrangement is provided at the opposite end of the ballbar 74, with the ball 72 of the holder 66 being magnetically coupled to a magnet provided in a recess on the end of the ballbar 74, and contacting three locating points on a bearing ring. Consequently, the ends of the ballbar 74 are accurately located with respect to the mounting pins 50 and 68 which, themselves, are rigidly fixed respectively to the arbor 2 and the table 4.

FIG. 1 shows the ballbar and its associated components assembled to perform a test in the XY plane in which the arbor is rotated relatively to the plane about an axis parallel to the Z axis and passing through the ball 72. The lower position of the ballbar 74 and the block 26 are shown in solid outline in FIG. 1, whereas the uppermost position is shown in dashed outline.

The ballbar incorporates a position sensor (not shown) which accurately measures any change in the length of the ballbar 74 as the block 26 turns about the ball 72. By suitable processing of the signal from the position sensor, it is possible to detect any variation from a purely circular path and, in some circumstances, to diagnose the cause of the variation.

FIG. 3 shows the equipment set up to perform a test in the YZ plane. It will be appreciated that the blocks 26 and 22 remain in the same positions as shown in FIG. 1 on the arbor 2 and the table 4. However, the holder 66 is moved from the mounting face 58, which lies in the XY plane of the machine, to the mounting face 60, which lies in the YZ plane. Also, the mounting pin 50 is moved from the bore 40 in the mounting plane 34 (in the XY plane) to the bore 40 in the mounting plane 38 (also the YZ plane).

In this configuration, the holder 66 projects outwardly beyond the edge of the table 4 to provide access for the full rotation of the mounting block 26. The availability of adequate clearance is also provided by the height of the mounting block 52, and the positioning of the recesses 62 in the upper region of the block, extending into the wall 56.

FIG. 4 shows the equipment set up to perform a test in the XZ plane, in which the mounting cup 66 and the mounting pin 50 are fitted, respectively, the mounting faces 54 and 36.

It will thus be appreciated that, by using the mounting components 8 and 10, the ballbar 74 can be used to perform tests about all three axes of the machine. The tests can be performed relatively easily, since the mounting components 8 and 10 do not have to be moved when setting up the equipment for different measurement planes. Only the mounting pin 50, the holder 66 and the ballbar 74 itself need to be moved.

Furthermore, the equipment can be used on a grinding machine owing to the construction of the mounting component 8 in the form of a ring 12.

The ballbar 74 and the holder 66 may be proprietary items, such as are available from Renishaw pic under the designation QC10.

The invention claimed is:

1. Ballbar equipment comprising:
 a tool mounting component for securing to a tool holder of a machine tool and adapted to receive a supporting element for connection to one end of a ballbar; and
 a table mounting component for securing to a table of the machine tool and adapted to receive a supporting element for connection to the other end of the ballbar, wherein each of the mounting components comprises three receiving means for receiving the respective supporting element, the receiving means of each mounting component being disposed orthogonally with respect to each other.

2. Ballbar equipment as claimed in claim 1, wherein the tool mounting component is adapted to be mounted on a tool holder in the form of an arbor for receiving a grinding wheel.

3. Ballbar equipment as claimed in claim 2, wherein the tool mounting component comprises a ring for fitting over the arbor.

4. Ballbar equipment as claimed in claim 3, wherein securing means is provided for securing the ring on the arbor.

5. Ballbar equipment as claimed in claim 3, wherein locking means is provided on the ring for preventing rotation of the arbor.

6. Ball equipment as claimed in claim 5, wherein the locking means comprises a lug on the ring, the lug being provided with a locking screw for engagement with a fixed part of the machine tool.

7. Ballbar equipment as claimed in claim 1, wherein the receiving means on the tool mounting component are provided on a mounting block which is connected to the ring by a connecting rod.

8. Ballbar equipment as claimed in claim 1, wherein the table mounting component comprises a mounting block adapted to be secured to the table.

9. Ballbar equipment as claimed in claim 8, wherein the receiving means of the block of the table mounting component comprise recesses for receiving magnetic holders.

10. Ballbar equipment as claimed in claim 1, wherein the tool mounting component comprises a ring for mounting on an arbor of a machine tool, and a mounting block connected to the ring for receiving a supporting element for the ballbar.

11. A method of evaluating a machine tool using ballbar equipment as claimed in claim 1, the method comprising:
 (a) mounting the tool mounting component on a tool holder of the machine tool;
 (b) mounting the table mounting component on a table of the machine tool, the mounting components being oriented so that the respective receiving means are directed oppositely to each other and aligned with a respective axis of the machine tool;
 (c) fitting supporting elements to an oppositely directed pair of receiving means;
 (d) connecting the ballbar between the supporting elements;
 (e) causing relative rotation between the tool holder and the table about one of the supporting elements; and
 (f) determining, by means of the ballbar, the path followed by the other mounting means during the relative rotation.

12. The method as claimed in claim 11, wherein the machine tool is a grinding machine.

* * * * *